United States Patent [19]

Fletcher et al.

[11] 4,088,999
[45] May 9, 1978

[54] RF BEAM CENTER LOCATION METHOD AND APPARATUS FOR POWER TRANSMISSION SYSTEM

[76] Inventors: James C. Fletcher, Administrator of the National Aeronautics and Space Administration, with respect to an invention of; Richard M. Dickinson, La Crescenta, Calif.

[21] Appl. No.: 688,852

[22] Filed: May 21, 1976

[51] Int. Cl.² ............................................. G01S 5/02
[52] U.S. Cl. .............................. 343/113 R; 343/119; 343/16 M
[58] Field of Search .......... 343/112 R, 112 C, 113 R, 343/119, 16 M

[56] References Cited

U.S. PATENT DOCUMENTS

| 3,353,180 | 11/1967 | Anderson | 343/16 M |
|---|---|---|---|
| 3,599,208 | 8/1971 | Nelson | 343/16 M |
| 3,701,158 | 10/1972 | Johnson | 343/770 |
| 3,949,955 | 4/1976 | Sykes et al. | 343/16 M |

*Primary Examiner*—Maynard R. Wilbur
*Assistant Examiner*—T. M. Blum

*Attorney, Agent, or Firm*—Monte F. Mott; John R. Manning; Paul F. McCaul

[57] ABSTRACT

In wireless power transmission systems, in order to provide maximum possible efficiency in the transfer of power, the receiving element of the system must intercept the greatest possible portion of the transmitted energy beam. By having a planar array of receiver elements that are symmetrically located about a physical center, it becomes possible to determine the location on the array of the center of energy of the incident beam. This information is obtained as follows. Sum the output energy of all the receiver elements to the right and left of the vertical center of the array. Determine the difference and sum of these two amounts. Divide the difference by the sum. The result is an indication of the degrees that the center of the incident beam is off in azimuth. Sum the output energy of all the receiver elements above and below the horizontal center of the array. Determine the difference and sum of these two amounts. Divide the difference by the sum. The result is an indication of the degrees that the center of the incident beam is off in elevation.

8 Claims, 6 Drawing Figures

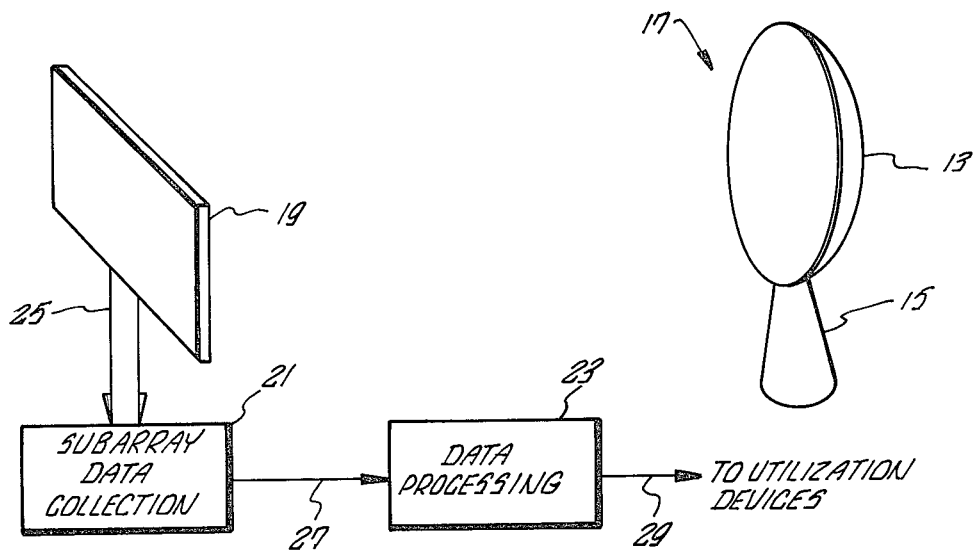
FIG_1_
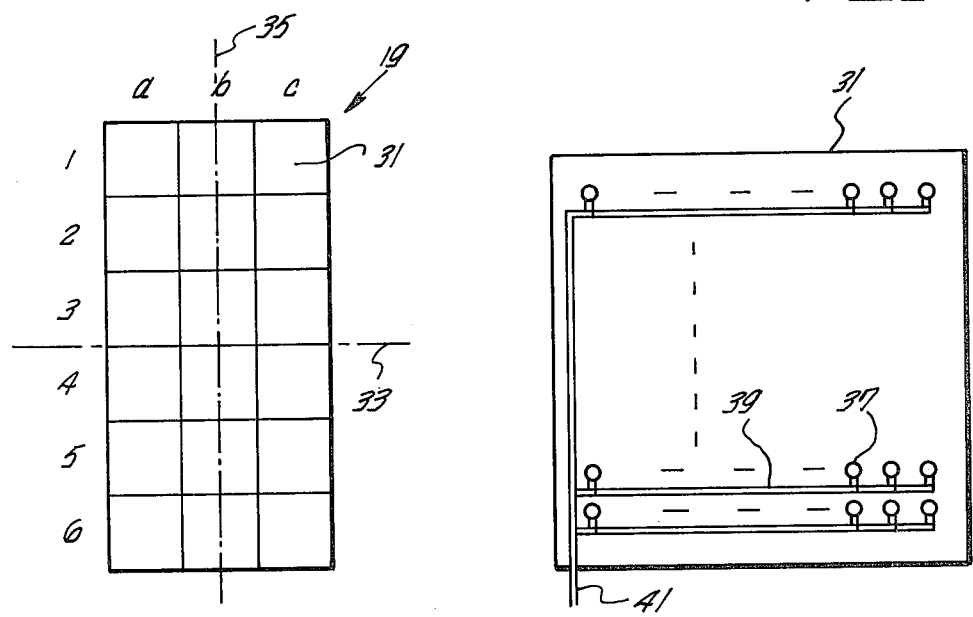
FIG_2_  FIG_3_
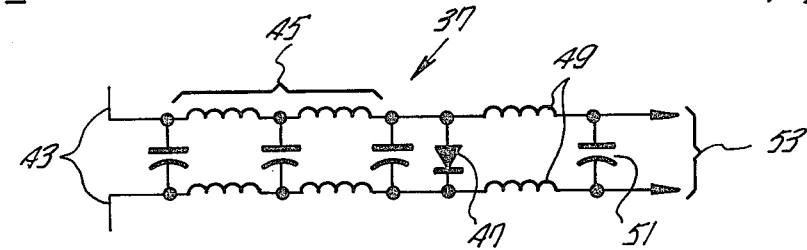
FIG_4_

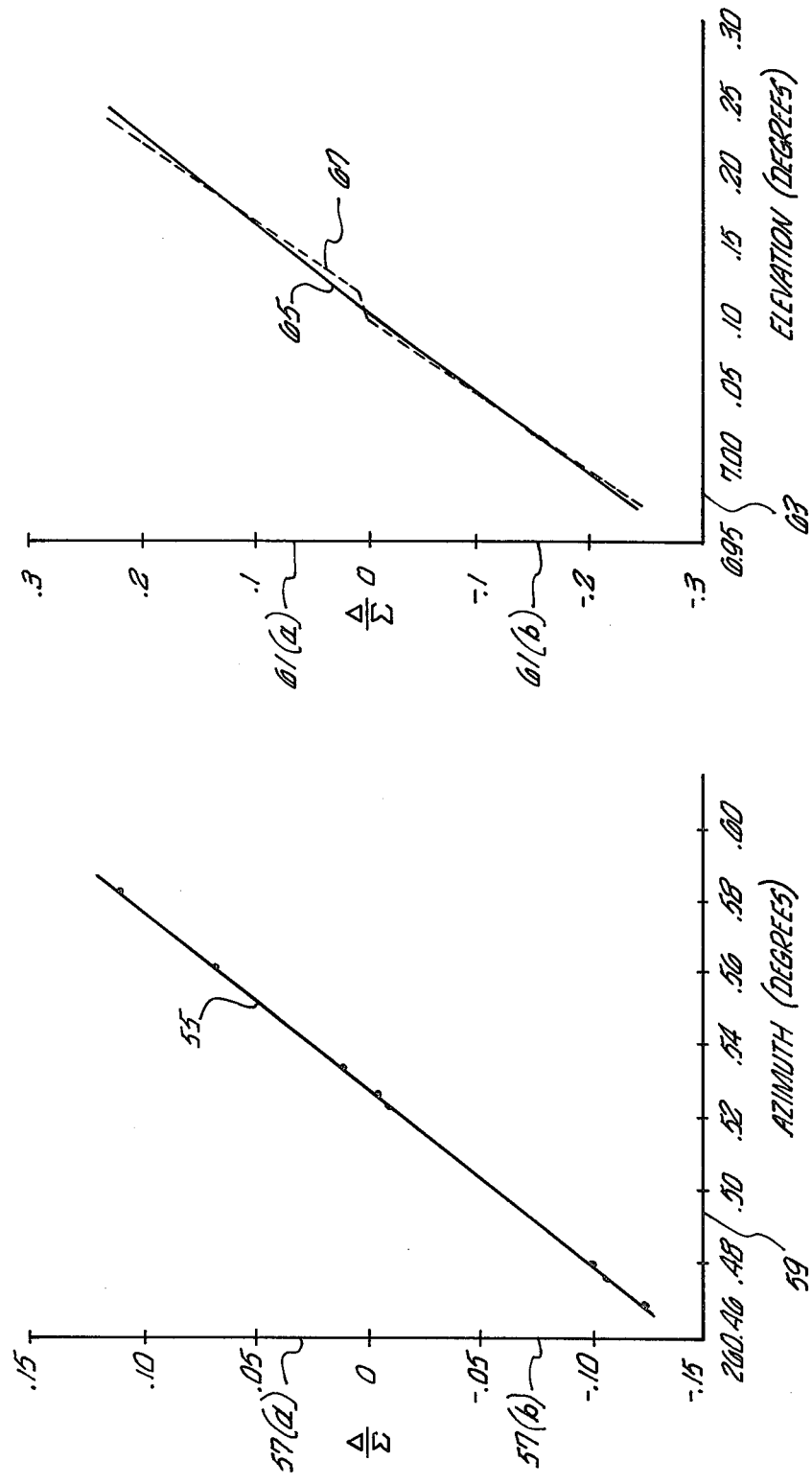

RF BEAM CENTER LOCATION METHOD AND APPARATUS FOR POWER TRANSMISSION SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates generally to improvements in a method and apparatus for locating the center of an incident beam on a receiving structure and, more particularly, pertains to a new and improved method and apparatus for locating the center of an incident beam on a receiving array of antenna elements wherein the incident beam is in the microwave region and utilized for the wireless transmission of power.

The concept of transmitting significant quantities of power by way of microwaves differs from the ordinary concept of communications by way of microwaves in that the elements of the microwave power transmission system are designed so that the largest proportion possible of the transmitted beam is intercepted by the receiving part of the system. This is important because in a microwave power transmission system the received power must be a significant portion of the transmitter output. This is not true in a communication system where the received power is typically on the order of hundreds of decibels below the transmitter output. For the purpose of example only, it will be assumed that the base band power output at the receiving end of a power transmission system is in DC. It should be understood, however, the power output may take other forms such as pulsating DC or even low frequency AC in the 60 cycle per second range.

The microwave power transmission system illustrated schematically in FIG. 1 is made up of a high power RF illuminator which is mounted in a well known manner on a tower or a similar mounting device which provides for the pointing of the illuminator in azimuth and elevation. The illuminator is beamed as closely as possible directly at the receiving element of the power transmission system.

The present invention provides a method and apparatus for determining where the center of the beam incident on the receiving structure is located on that structure. For maximum efficiency and power transfer between the illuminator and the receiver, the center of the incident beam should be lined up with the physical center of the receiver array.

Prior art systems that have been concerned with the reception of incident waves at the center of a receiving target have all been concerned with or directed to monopulse radar systems. These monopulse radar systems basically involve a 4 segment receiver element which may take the form of 4 feed horns or multiple dipole elements divided into 4 equal segments. The basic concept involved is that when the receiving array is on target, that is, lined up with the direction from which the reflected signal is being received, all four segments of the receiving array are evenly illuminated as indicated by the sum and difference levels from each of the receiving segments. In addition, these sum and difference levels from each of the feed horns or 4 segments can be used and are used to generate error magnitude signals for re-directing the receiving antenna to receive equal energy at all four segments.

The receiving array of the present invention as shown in FIG. 2 is made up of a plurality of subarrays arranged about a horizontal and a vertical center. This arrangement permits the determination of where the center of the incident beam is located on the receiving array. The monopulse radar technique only provides a general indication of whether the incident beam center is aligned or not aligned with the receiving array.

OBJECTS AND SUMMARY OF THE INVENTION

It is an object of this invention to provide means for locating the beam center of microwave energy incident on a receiving array.

It is a further object of this invention to provide a method for locating the beam center of microwave energy incident on a receiving array.

These objects and the general purpose of the invention are accomplished as follows. The receiving array is made up of a plurality of rectenna elements mounted in a planar array in a symmetrical manner about a physical center. The output energy of all the elements to the right and left of the vertical center of the array are summed to provide respective quantities. The ratio of the difference of these quantities to their sum is an indication of the degrees that the center of the incident energy beam is off-center in azimuth. The output energy of all the elements above and below the horizontal center of the array are summed to provide respective quantities. The ratio of the difference of these quantities to their sum is an indication of the degrees that the center of the incident energy beam is off-center in elevation.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein;

FIG. 1 is a schematic and block diagram illustration of the basic elements of a wireless power transmission system utilizing the present invention.

FIG. 2 is a schematic illustration of the microwave receiving array of the transmission system of FIG. 1.

FIG. 3 is a schematic illustration of a subarray which is one of the elements of the receiving array of FIG. 2.

FIG. 4 is a schematic illustration of the elements of the subarray of FIG. 3.

FIG. 5 is a graph illustrating the correlation between the azimuth degrees and the azimuth pointing ratio, calculated by the energy.

FIG. 6 is a graph correlating the elevation degrees with the elevation pointing ratio, calculated by using the energy outputs of the dipole array.

DESCRIPTION OF THE PREFERRED EMBODIMENTS

The output power of the receiving array 19 is dissipated by useful machines (not shown) that are well known in the art. A small portion of the energy received by each dipole element in the array 19 is supplied over cabling 25 to subarray data collection circuitry 21 which is merely interface circuitry for the data processing circuitry 23. The energy signals received from the array 19 by the data collection circuitry 21 are supplied to the data processing circuitry 23 over cables 27 which may be time division or space division channels. The data processing circuitry 23 is preferably a minicomputer of the type well known in the art, programmed to perform the calculations which will be further described below. The results of such calculations are supplied over lines 29 to utilization devices. These devices, depending upon the application of the invention, may be azimuth position control and elevation position control signals to the RF power transmitting antenna 17 or to the power receiving array 19, or may simply be directed to instrumentation which indicates azimuth and elevation.

In an open loop configuration the signals on line 29 are supplied to instrumentation which indicates the location in terms of azimuth and elevation of the center of the incident beam on the receiving array 19. These indications find utility in various aspects. For example, they may be utilized to check the performance accuracy of other beam pointing schemes which are directed towards insuring that the illuminator 13 of the transmitting station is directly aimed at the receiving array 19. They may be utilized to determine the pointing coordinates of various locations in and about the power receiving array 19 such as auxilliary field intensity devices located near the array, the edges of the array or the centers of various subarrays. They may be used to monitor the position stability of various alternate pointing schemes as a function of auxilliary parameters such as temperature, time, etc..

In a closed loop configuration the signals on line 29 may be utilized for the purpose of maximizing power transfer in the microwave power transmission system. In such a case the information on line 29 would be supplied to the azimuth and elevation servo motors of the RF illuminator 13 of antenna 17 to control the pointing position of the illuminator so that the center of its beams are incident on the receiver 19 in coincidence with the physical center of the receiving array 19. The azimuth and elevation correction signals may be supplied to the remotely located transmitting device 17 either by cables or radio links (not shown). If preferred, these signals may also be supplied to the receiving array 19 to correct its azimuth and elevation, either separately or together with adjusting the azimuth and elevation of the illuminator 13 of the transmitter.

The receiving array 19 comprises a plurality of subarrays 31 arranged about a horizontal center 33 and a vertical center 35. For purposes of simplicity the array is being illustrated as three vertical columns A, B, C, and six horizontal rows 1 through 6. Each subarray 31 is made up of a plurality of dipole rectenna elements 37 connected in series-parallel. The preferred wiring of the parallel wired horizontal rows 39 of the subarray consists of six series groups of three each of the parallel wired horizontal rows 39. In the preferred embodiment, 15 rectenna elements 37 are provided in each parallel row 39. By connecting 45 diodes in parallel a sufficient short circuit current is generated for fusing open any diode in the circuit that fails by shorting. In this manner the subarray is made self-clearing in case of a fault. The power output of the array 31 is supplied over a pair of lines 41 to the subarray data collection circuit 21 from where it is passed on to the microcomputer for processing.

Each of the rectenna elements 37 in a subarray comprises a dipole antenna 43, a diode 47, and filter elements. The concept and operation of a rectenna element is described in U.S. Pat. No. 3,434,678 issued to W. C. Brown. The rectenna utilized in the present array comprises a balanced transmission line low pass filter section 45, an impedance transformer 49, an RF bypass capacitor 51, and DC output leads 53 which connect to the parallel lines or bus bars in the subarrays 31.

The data processing circuitry 23 which may be a microcomputer, will effectively generate the following two equations.

$$\frac{\Delta_{az}}{\Sigma_{az}} = \frac{\Sigma P_L - \Sigma P_R}{\Sigma P_L + \Sigma P_R} \qquad 1.$$

Where:
$P_L$ = power of rectenna elements left of vertical center.
$P_R$ = power of rectenna elements right of vertical center.

$$\frac{\Delta_{el}}{\Sigma_{el}} = \frac{\Sigma P_A - \Sigma P_B}{\Sigma P_A + \Sigma P_B} \qquad 2.$$

Where:
$P_A$ = power of rectenna elements above horizontal center.
$P_B$ = power of rectenna elements below horizontal center.

Equation 1 provides the azimuth error signal. Equation 2 provides the elevation error signal for the center of an RF beam incident on the receiving planar array.

For the specific array of FIG. 2:

$$\Sigma P_L = P_{c_1} + P_{c_2} + P_{c_3} + P_{c_4} + P_{c_5} + P_{c_6}$$

$$\Sigma P_R = P_{a_1} + P_{a_2} + P_{a_3} + P_{a_4} + P_{a_5} + P_{a_6}$$

$$\Sigma P_A = P_{a_2} + P_{b_2} + P_{c_2} + P_{a_3} + P_{b_3} + P_{c_3}$$

$$\Sigma P_E = P_{a_4} + P_{b_4} + P_{c_4} + P_{a_5} + P_{b_5} + P_{c_5}$$

Substituting these quantities into equations 1 and 2 we obtain the equations 3 and 4, respectively:

$$\frac{\Delta_{az}}{\Sigma_{az}} = \frac{(P_{c_1} + P_{c_2} + P_{c_3} + P_{c_4} + P_{c_5} + P_{c_6}) - (P_{a_1} + P_{a_2} + P_{a_3} + P_{a_4} + P_{a_5} + P_{a_6})}{(P_{c_1} + P_{c_2} + P_{c_3} + P_{c_4} + P_{c_5} + P_{c_6} + P_{a_1} + P_{a_2} + P_{a_3} + P_{a_4} + P_{a_5} + P_{a_6})} \qquad 3.$$

$$\frac{\Delta_{el}}{\Sigma_{el}} = \frac{(P_{a_2} + P_{b_2} + P_{c_2} + P_{a_3} + P_{b_3} + P_{c_3}) - (P_{a_4} + P_{b_4} + P_{c_4} + P_{a_5} + P_{b_5} + P_{c_5})}{(P_{a_2} + P_{b_2} + P_{c_2} + P_{a_3} + P_{b_3} + P_{c_3} + P_{a_4} + P_{b_4} + P_{c_4} + P_{a_5} + P_{b_5} + P_{c_5})} \qquad 4.$$

FIGS. 5 and 6 illustrate the performance of the pointing ratio, $(\Delta/\Sigma)$, on the vertical axes 57 and 61 versus the azimuth and elevation degrees on the horizontal axes 59 and 63 respectively.

Referring to FIG. 5, which illustrates the azimuth pointing ratio versus azimuth degrees, it can be seen that the relation between the two is linear, as represented by the line 55. The ratio indications 51 (a) above the zero mark on the vertical axes are positive indications, those below zero 57 (b) are negative indications. This graph clearly shows that the pointing ratio magnitude is approximately linear, about the vertical center line of the array, and changes as the beam center moves from one half of the receiving array to the other half. Note that the difference between plus 0.15 and minus 0.15 in the pointing ratio is approximately 0.15 degrees in azimuth.

Referring now to FIG. 6, which illustrates the elevation pointing ratio versus elevation degrees, again the relationship is seen as relatively linear. The indications on line 61 (a) above the zero mark on the vertical axis are positive magnitudes, whereas those below zero 61 (b) are negative magnitudes. The relation defined by line 65 is for a 300 kilowatt system. The relationship defined by the broken line 67 is for a 250 kilowatt system. Note that the difference between plus 0.3 and minus 0.3 in the pointing ratio is approximately 0.30° in elevation. This clearly indicates that the pointing ratio is an excellent indicator of perfect beam alignment with the intercepting array.

In summary, the present invention provides a method and apparatus for locating the beam center of microwave energy incident on a receiving structure.

What is claimed is:

1. In an RF power transmission system wherein an energy source generates an energy beam towards a receiving structure, apparatus for locating the center of the energy beam incident on said receiving structure, said apparatus comprising:
   a planar array of RF receiver elements arranged about a physical center in a matrix pattern;
   means for providing signals indicative of the energy received by each of said receiver elements;
   means for summing the signal quantities for all the receiver elements to the right of a predetermined vertical center line of said planar array to provide a right azimuth sum quantity;
   means for summing the signal quantities for all the receiver elements to the left of a predetermined vertical center line of said planar array to provide a left azimuth sum quantity;
   means for providing the difference and sum of said right and left azimuth sum quantities;
   means for generating the ratio of the azimuth difference and sum, said ratio indicating the degrees that the center of the incident energy beam is off-center in azimuth from the predetermined vertical center line;
   means for summing the signal quantities for all the receiver elements above a predetermined horizontal center line of said planar array to provide an above elevation sum quantity;
   means for summing the signal quantities for all the receiver elements below a predetermined horizontal center line of said planar array to provide a below elevation sum quantity;
   means for providing the difference and sum of said above and below elevation sum quantities; and
   means for generating the ratio of the elevation difference and sum, said ratio indicating the degrees that the center of the incident energy beam is off-center in elevation from the predetermined horizontal center line.

2. The apparatus of claim 1 wherein said planar array comprises:
   a plurality of subarrays, each subarray comprising a plurality of dipole elements connected to RF energy rectifying circuitry.

3. The apparatus of claim 2 wherein said plurality of dipole elements in each said subarrays are connected together in series-parallel.

4. The apparatus of claim 2, wherein said means for providing the azimuth sum quantities, sums the outputs from the subarrays, forming vertical columns to the right and left of the center column of the planar array; and wherein said means for providing said elevation sum quantities, sums the output from the subarrays, forming horizontal rows above and below the horizontal center of the planar array.

5. The apparatus of claim 1 wherein said planar array comprises:
   eighteen subarrays arranged in a three by six matrix.

6. The apparatus of claim 5 wherein each said subarray comprises a plurality of dipole elements connected to RF energy rectifying circuitry.

7. In an RF power transmission system wherein an energy source generates an energy beam towards an array of RF receiver elements, a method for locating the center of the energy beam incident on said receiving array, said method comprising:
   sampling the output of said receiver elements to provide signals indicative of the energy received by each of said receiver elements;
   summing the signals sampled from all the receiver elements to the right of a predetermined vertical center line of said array of receiver elements;
   summing the signals sampled from all the receiver elements to the left of the predetermined vertical center line of said array of receiver elements;
   summing the sums from said elements left and right of the predetermined vertical center line;
   forming the difference between the sums from said elements left and right of the predetermined vertical center line; and
   generating the ratio of the quantity of step five with the quantity of step four, said ratio indicating the degrees that the center of the incident energy beam is off-center in azimuth from the predetermined vertical center line.

8. In an RF power transmission system wherein an energy source generates an energy beam towards an array of RF receiver elements, a method for locating the center of the energy beam incident on said receiving array, said method comprising:
   sampling the output of said receiver elements to provide signals indicative of the energy received by each of said receiver elements;
   summing the signals sampled from all the receiver elements above a predetermined horizontal center line on said array;
   summing the signals sampled from all the receiver elements below the predetermined horizontal center line on said array;
   summing the sums from said elements above and below the predetermined horizontal center line;
   forming the difference between the sums from said elements above and below the predetermined horizontal center line of said array; and
   generating the ratio of the quantity of step five with the quantity of step four, said ratio indicating the degrees that the center of the incident energy beam is off-center in elevation from the predetermined horizontal center line.

* * * * *